United States Patent
Sano et al.

(10) Patent No.: US 7,942,960 B2
(45) Date of Patent: May 17, 2011

(54) WHITE INK COMPOSITION AND RECORDED MATERIAL USING THE SAME

(75) Inventors: Tsuyoshi Sano, Shiojiri (JP); Takayoshi Kagata, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/315,800

(22) Filed: Dec. 5, 2008

(65) Prior Publication Data

US 2009/0182098 A1    Jul. 16, 2009

(30) Foreign Application Priority Data

Dec. 5, 2007 (JP) ................. 2007-314943

(51) Int. Cl.
*C09D 11/00* (2006.01)

(52) U.S. Cl. ................. 106/31.6; 106/31.13; 106/31.65; 106/31.75; 106/31.97; 106/85; 106/89; 106/96; 106/97; 523/160; 523/161; 524/590; 524/871; 525/453

(58) Field of Classification Search ............... 106/31.13, 106/31.65, 31.75, 31.97, 31.6, 85, 96, 89; 523/160, 161; 524/871, 590; 525/453
See application file for complete search history.

(56) References Cited

U.S. PATENT DOCUMENTS

| 4,880,465 A | 11/1989 | Loria et al. |
| 7,176,248 B2 * | 2/2007 | Valentini et al. ............... 523/160 |
| 2004/0110868 A1 * | 6/2004 | Zhu et al. ...................... 523/160 |
| 2005/0003165 A1 * | 1/2005 | Hayashi ...................... 428/195.1 |
| 2007/0191509 A1 * | 8/2007 | Kobayashi .................... 523/160 |

FOREIGN PATENT DOCUMENTS

JP    3562754 A    9/2000

OTHER PUBLICATIONS

Machine translation of JP 2006-257264, Hiroshi et al, Sep. 28, 2006 [online], accessed via the Internet [retrieved on Jan. 14, 2010], URL: <http://www4.ipdl.inpit.go.jp/Tokujitu/PAJdetail.ipdl?N0000=60&N0120=01&N2001=2&N3001=2006-257264>.*

Momentive Performance Materials, Silwet® L-7622 MSDS [online], accessed via the Internet [retrieved on Jan. 14, 2010], URL: <http://www.essentialingredients.com/msds/L-7622.pdf>.*

* cited by examiner

*Primary Examiner* — David Wu
*Assistant Examiner* — Robert Jones
(74) *Attorney, Agent, or Firm* — Nutter McClennen & Fish LLP; John J. Penny, Jr.

(57) ABSTRACT

The present invention provides a white ink composition that can give a white image having excellent abrasion resistance. The white ink composition according to the invention is a white ink composition containing hollow resin particles and a polyurethane resin characteristically having a glass transition temperature of 50° C. or less.

10 Claims, No Drawings

WHITE INK COMPOSITION AND RECORDED MATERIAL USING THE SAME

CROSS-REFERENCES TO RELATED APPLICATIONS

The entire disclosure of Japanese Patent Application No. 2007-314943, filed on Dec. 5, 2007, is expressly incorporated by reference herein.

FIELD OF THE INVENTION

The present invention relates to a white ink composition and a recorded material formed by using the same.

BACKGROUND OF THE INVENTION

A white ink composition containing hollow polymer microparticles as a white pigment has been known (for example, see Patent Document 1). The hollow polymer microparticles have hollows in the interior thereof, and their outer envelope is made of a liquid-permeable resin. In the hollow polymer microparticles, light scattering is caused by a difference in refractive indices between the outer envelope and the hollow, and thereby a concealing effect can be achieved.

However, since the above-mentioned white ink composition contains hollow polymer particles, as a pigment, having a particle size larger than those of common pigments, it has disadvantages that the fixability of the ink on a recording medium is inferior and the abrasion resistance of the printed surface is insufficient.

[Patent Document 1] U.S. Pat. No. 4,880,465 specification

SUMMARY OF THE INVENTION

An advantage of some aspects of the invention is to provide a white ink composition that can give a white image excellent in abrasion resistance.

Means for Solving the Problems

The white ink composition according to an aspect of the invention is a white ink composition containing hollow resin particles and a polyurethane resin having a glass transition temperature of 50° C. or less.

In the white ink composition, though detailed reasons are not clear, a white image having excellent fixability of the ink on a recording medium and sufficient abrasion resistance can be formed.

In the white ink composition according to an aspect of the invention, the polyurethane resin can be dispersed as particles in a solvent.

In the white ink composition according to an aspect of the invention, the amount of the polyurethane resin can be 0.5 to 10% by weight.

In the white ink composition according to an aspect of the invention, the hollow resin particles have an average particle diameter of 0.2 to 1.0 μm.

In the white ink composition according to an aspect of the invention, the amount of the hollow resin particles is 5 to 20% by weight.

The white ink composition according to an aspect of the invention can further contain at least one selected from alkanediols and glycol ethers.

The white ink composition according to an aspect of the invention can further contain an acetylene glycol surfactant or a polysiloxane surfactant.

The white ink composition according to an aspect of the invention can be applied to an ink-jet recording system.

A recorded material according to an aspect of the invention is characterized by that an image is formed by using the above-mentioned white ink composition.

Advantageous Effect of the Invention

In the above-mentioned white ink composition, since an image is formed while spreading the polyurethane resin having a glass transition temperature of 50° C. or less on a recording medium, the hollow resin particles serving as the white pigment can be more firmly fixed on the recording medium. By doing so, a white image having excellent abrasion resistance can be obtained.

DETAILED DESCRIPTION OF THE PRESENT INVENTION

A preferred embodiment of the invention will be described in detail below.

1 White Ink Composition

The white ink composition according to an aspect of the invention is a white ink composition containing hollow resin particles and a polyurethane resin characteristically having a glass transition temperature of 50° C. or less.

1.1 Hollow Resin Particles

The white ink composition according to this embodiment contains hollow resin particles as a white organic pigment. The hollow resin particles have hollows in the interiors thereof, and their outer envelope is made of a liquid-permeable resin. Therefore, when the hollow resin particles are present in an aqueous ink composition, the inner hollows are filled with the aqueous solvent. The particles filled with the aqueous solvent have a specific gravity that is approximately the same as that of the external aqueous solvent. Consequently, dispersion stability can be maintained, without causing precipitation in the aqueous ink composition. Therefore, the storage stability and the discharge stability of the white ink composition can be increased.

Furthermore, when the white ink composition according to this embodiment is discharged on a recording medium such as paper, the aqueous solvent in the interiors of the particles is drawn out during a drying process to form hollows. Consequently, the particles contain air in the interiors thereof, and thereby a resin layer and an air layer that have different refractive indices are formed in the particles. As a result, incident light is effectively dispersed to give a white color.

The hollow resin particles used in this embodiment are not particularly limited and may be known one. For example, the hollow resin particles described in the specifications of U.S. Pat. No. 4,880,465 and Japanese Patent No. 3562754 can be preferably used.

The average particle diameter (outer diameter) of the hollow resin particles is preferably 0.2 to 1.0 μm and more preferably 0.4 to 0.8 μm. When the outer diameter is larger than 1.0 μm, the dispersion stability may be impaired by, for example, precipitation of the particles, and also reliability may be impaired by, for example, clogging of an ink-jet recording head. On the other hand, when the outer diameter is smaller than 0.2 μm, the degree of whiteness tends to be insufficient. In addition, an inner diameter of about 0.1 to 0.8 μm is appropriate.

The average particle diameter of the hollow resin particles can be measured with a particle size distribution analyzer employing laser diffraction scattering as the measurement principle. As the laser diffraction particle size distribution analyzer, for example, a particle size distribution analyzer (for example, "Microtrac UPA" manufactured by Nikkiso Co., Ltd.) employing dynamic light scattering as the measurement principle can be used.

The amount (solid content) of the hollow resin particles is preferably 5 to 20% by weight and more preferably 8 to 15% by weight based on the total weight of the ink composition. When the amount (solid content) of the hollow resin particles is higher than 20% by weight, reliability may be impaired by, for example, clogging of an ink-jet recording head. On the other hand, in an amount of lower than 5% by weight, the degree of whiteness tends to be insufficient.

The process of preparing the hollow resin particles is not particularly limited, and a known process can be used. For example, a process, so-called emulsion polymerization, can be applied to the preparation of the hollow resin particles. In the process, emulsion of hollow resin particles is formed by stirring a vinyl monomer, a surfactant, a polymerization initiator, and an aqueous dispersion solvent in a nitrogen atmosphere while heating.

Examples of the vinyl monomer include nonionic monoethylene unsaturated monomers such as styrene, vinyl toluene, ethylene, vinyl acetate, vinyl chloride, vinylidene chloride, acrylonitrile, (meth)acrylamide, and (meth)acrylic acid ester. Examples of the (meth)acrylic acid ester include methyl acrylate, methyl methacrylate, ethyl (meth)acrylate, butyl (meth)acrylate, 2-hydroxyethyl methacrylate, 2-ethylhexyl (meth)acrylate, benzyl (meth)acrylate, lauryl (meth)acrylate, oleyl (meth)acrylate, palmityl (meth)acrylate, and stearyl (meth)acrylate.

In addition, the vinyl monomer may be a bifunctional vinyl monomer. Examples of the bifunctional vinyl monomer include divinyl benzene, allyl methacrylate, ethylene glycol dimethacrylate, 1,3-butane-diol dimethacrylate, diethylene glycol dimethacrylate, and trimethylolpropane trimethacrylate. High cross-linking formed by copolymerizing the above-mentioned monofunctional vinyl monomer and the bifunctional vinyl monomer can give hollow resin particles having not only light scattering properties but also properties such as heat resistance, solvent resistance, and dispersibility in solvent.

Any surfactant that can form molecule assembly in water, such as micelle, can be used, and examples thereof include anionic surfactants, nonionic surfactants, cationic surfactants, and ampholytic surfactants.

The polymerization initiator may be any known compound that is soluble in water, and examples thereof include hydrogen peroxide and potassium persulfate.

Examples of the aqueous dispersion solvent include water and water containing a hydrophilic organic solvent.

1.2 Polyurethane Resin

The white ink composition according to this embodiment contains a polyurethane resin.

The polyurethane resin may be an emulsion type in which the resin in a particle form is dispersed in a solvent or a solution type in which the resin is dissolved in a solvent. The emulsion type can be further classified into a forcibly emulsified type and a self emulsified type according to the emulsification process, and both types can be used in this embodiment.

The glass transition temperature (Tg) of the polyurethane resin used in this embodiment is necessarily 50° C. or less and is preferably about 20° C. Detailed reasons are not clear, but since an image is formed while spreading the polyurethane resin having a glass transition temperature of 50° C. or less on a recording medium, the hollow resin particles serving as the white pigment can be more firmly fixed on the recording medium. By doing so, a white image having excellent abrasion resistance can be obtained. On the other hand, a white ink composition containing a polyurethane resin having a glass transition temperature higher than 50° C. cannot form an image having excellent abrasion resistance, and such an image is readily peeled off by rubbing the printed surface with, for example, a nail.

When the polyurethane resin is the emulsion type, the average particle diameter of the polyurethane resin is preferably 50 to 200 nm and more preferably 60 to 200 nm. The polyurethane resin particles having an average particle diameter within the above-mentioned range can be uniformly dispersed in the white ink composition.

The amount (solid content) of the polyurethane resin is preferably 0.5 to 10% by weight, more preferably 0.5 to 5% by weight, and most preferably 1 to 3% by weight based on the total weight of the ink composition. When the amount of the polyurethane resin is higher than 10% by weight, reliability (such as clogging and discharge stability) of the ink may be impaired, and the physical properties (such as viscosity) obtained may be insufficient as an ink. On the other hand, in an amount of lower than 0.5% by weight, the fixability of the ink on a recording medium is inferior, and the formed image cannot have excellent abrasion resistance.

Examples of the polyurethane resin used in this embodiment include forcibly emulsified polyurethane emulsions, such as "Takelack (registered trade name) W-6061" (manufactured by Mitsui Chemicals Inc.), and self emulsified polyurethane emulsions, such as "Takelack (registered trade name) W-6021" (manufactured by Mitsui Chemicals Inc.), "WBR-2019" and "WBR-022U" (these are manufactured by Taisei Finechemical Co., Ltd.).

The process of producing such a polyurethane resin can be a known process. For example, the polyurethane resin can be produced by reacting a polyisocyanate, a polyol, and a chain extender in the presence or absence of a catalyst.

1.3 Permeable Organic Solvent

The white ink composition according to this embodiment preferably contains at least one selected from alkanediols and glycol ethers. The alkanediols and the glycol ethers can increase wettability of an ink to a recording surface of, for example, a recording medium and thereby increase the permeability of the ink.

The alkanediols are preferably 1,2-alkanediols having 4 to 8 carbon atoms, such as 1,2-butanediol, 1,2-pentanediol, 1,2-hexanediol, 1,2-heptanediol, and 1,2-octanediol. Among them, more preferred are 1,2-hexanediol, 1,2-heptanediol, and 1,2-octanediol, which have 6 to 8 carbon atoms, because of their particularly high permeability to a recording medium.

Examples of the glycol ethers include lower alkyl ethers of polyols, such as ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, dipropylene glycol monomethyl ether, dipropylene glycol monoethyl ether, triethylene glycol monomethyl ether, triethylene glycol monobutyl ether, and tripropylene glycol monomethyl ether. Among them, triethylene glycol monobutyl ether can give a satisfactory recording quality.

The amount of at least one selected from these alkanediols and glycol ethers is preferably 1 to 20% by weight and more preferably 1 to 10% by weight based on the total amount of the ink composition.

1.4 Surfactant

The white ink composition according to this embodiment preferably contains an acetylene glycol surfactant or a polysiloxane surfactant. The acetylene glycol surfactant or the polysiloxane surfactant can increase wettability of an ink to a recording surface of, for example, a recording medium and thereby increase the permeability of the ink.

Examples of the acetylene glycol surfactant include 2,4,7,9-tetramethyl-5-decyne-4,7-diol, 3,6-dimethyl-4-octyne-3,6-diol, 3,5-dimethyl-1-hexyn-3-ol, and 2,4-dimethyl-5-hexyn-3-ol. In addition, commercially available acetylene glycol surfactants can be used, and examples thereof include Olfin E1010, STG, and Y (these are manufactured by Nisshin Chemical Industry Co., Ltd.) and Surfynol 104, 82, 465, 485, and TG (these are manufactured by Air Products and Chemicals Inc.).

The polysiloxane surfactant may be commercially available one, and examples thereof include BYK-347 and BYK-348 (manufactured by BYK-Chemie, Japan).

Furthermore, the white ink composition according to this embodiment may contain another surfactant such as an anionic surfactant, a nonionic surfactants, or an ampholytic surfactant.

The amount of the surfactant is preferably 0.01 to 5% by weight and more preferably 0.1 to 0.5% by weight based on the total weight of the ink composition.

1.5 Polyol

The white ink composition according to this embodiment preferably contains a polyol. The polyol can suppress drying of ink and prevent ink from clogging an ink-jet recording head, when the white ink composition according to this embodiment is applied to an ink-jet recording apparatus.

Examples of the polyol include ethylene glycol, diethylene glycol, triethylene glycol, polyethylene glycol, polypropylene glycol, propylene glycol, butylene glycol, 1,2,6-hexanetriol, thioglycol, hexylene glycol, glycerine, trimethylolethane, and trimethylolpropane.

The amount of the polyol is preferably 0.1 to 3.0% by weight and more preferably 0.5 to 20% by weight based on the total amount of the ink composition.

1.6 Tertiary Amine

The white ink composition according to this embodiment preferably contains a tertiary amine. The tertially amine functions as a pH adjuster and can readily adjust pH of the white ink composition.

Examples of the tertiary amine include triethanolamine.

The amount of the tertiary amine is preferably 0.01 to 10% by weight and more preferably 0.1 to 2% by weight based on the total amount of the ink composition.

1.7 Other Components

The white ink composition according to this embodiment usually contains water as a solvent. The water used is preferably pure water or ultrapure water, such as ion-exchanged water, ultrafiltered water, reverse osmosis water, or distilled water. In particular, water prepared by sterilizing the above-mentioned water with ultraviolet irradiation or hydrogen peroxide addition can suppress growth of fungi and bacteria for a long period of time and is therefore preferred.

The white ink composition according to this embodiment can contain additives, according to need, for example, a fixing agent such as water-soluble rosin, a fungicide or antiseptic such as sodium benzoate, an antioxidant or ultraviolet absorber such as alohanates, a chelating agent, and an oxygen absorbent. These additives may be used alone or in a combination of two or more.

1.8 Others

The white ink composition according to this embodiment can be prepared using a known apparatus, such as a ball mill, a sand mill, an attritor, a basket mill, or a roll mill, as in known pigment inks. In the preparation, coarse particles are preferably removed using a membrane filter or a mesh filter.

The white ink composition according to this embodiment can form a white image by being applied to various types of recording media. Examples of the recording media include paper, heavy paper, fiber products, sheets or films, plastic, glass, and ceramics.

The white ink composition according to this embodiment is not particularly limited in its application and can be applied to various types of ink-jet recording systems. Examples of the ink-jet recording system include thermal ink jet, piezo ink jet, continuous ink jet, roller application, and spray application systems.

The invention can also provide a recorded material including an image formed by using the above-described white ink composition. In the recorded material according to an aspect of the invention, the fixability of the ink on the recording medium can be excellent and the abrasion resistance can be sufficient.

EXAMPLES

2. Example

The invention will be described in detail with reference to an Example below, but the invention is not limited thereto.

2.1 Preparation of White Ink Composition

Hollow resin particles, a resin emulsion, an organic solvent, a polyol, a tertiary amine, a surfactant, ion-exchanged water in blending ratios shown in Table 1 were stirred and mixed. After filtration through a metal filter with a pore size of 5 μm and deaeration with a vacuum pump, each of the ink compositions of Examples 1 to 4 and Comparative Examples 1 to 3 was obtained. The unit of numerical values referred to Examples and Comparative Examples in Table 1 is "% by weight".

Each component shown in Table 1 will be described below.

The hollow resin particles used were, as shown in Table 1, commercially available one, "SX8782(D)" (manufactured by JSR Corp.). SX8782(D) is water dispersible and has an outer diameter of 1.0 μm and an inner diameter of 0.8 μm, and the amount of solid content thereof is 28%.

The polyurethane resins used were, as shown in Table 1, commercially available emulsion type resins, "Takelack W-6061", "Takelack W-6021", and "Takelack WS-5000" (these are manufactured by Mitsui Chemicals Inc.) and "WBR-2019" and "WBR-022U" (these are manufactured by Taisei Finechemical Co., Ltd.).

"Takelack W-6061" is a forcibly emulsified polyurethane emulsion having a solid content of 30%, an average particle diameter of 100 nm, and a glass transition temperature of 25° C.

"Takelack W-6021" is a self emulsified polyurethane emulsion having a solid content of 30%, an average particle diameter of 90 nm, and a glass transition temperature of −60° C.

"Takelack WS-5000" is a self emulsified polyurethane emulsion having a solid content of 30%, an average particle diameter of 70 nm, and a glass transition temperature of 65° C.

"WBR-2019" is a self emulsified polyurethane emulsion having a solid content of 32.5% and a glass transition temperature of 45° C.

"WBR-022U" is a self emulsified polyurethane emulsion having a solid content of 31% and a glass transition temperature of 20° C.

"SE-909E" is an anionic acrylic emulsion having a solid content of 40.5% and a glass transition temperature of 20° C.

"3MF-574" is an acrylic acid copolymer emulsion having a solid content of 45.5% and a glass transition temperature of 70° C.

"BYK-348" (manufactured by BYK-Chemie, Japan) is a polysiloxane surfactant.

2.2 Evaluation of Abrasion Resistance

Each of the white ink compositions shown in Table 1 was loaded into a black ink chamber of a cartridge specific for an ink-jet printer ("PX-G930", manufactured by Seiko Epson Corp.). The thus prepared ink cartridge was mounted on the printer, and a printing test was carried out. Ink cartridges other than that for black ink were commercially available ones, which were used only as dummies and were not used in the evaluation in this Example and, accordingly, were not involved in the effects.

Then, output was carried out against recording paper specific for ink-jet recording ("OHP sheet", manufactured by Seiko Epson Corp.) at a resolution of 720×720 dpi. The printing pattern was a 100% duty solid pattern.

In this specification, the "duty" is a value calculated by the following equation:

$$\text{duty (\%)} = [(\text{number of dots actually printed})/\{(\text{vertical resolution}) \times (\text{horizontal resolution})\}] \times 100.$$

(in the equation, the "number of dots actually printed" is the number of dots actually printed per unit area, the "vertical resolution" and the "horizontal resolution" are each a resolution per unit area, and 100% duty means the maximum weight of ink of a single color for pixels.)

Then, the OHP sheets printed by the white ink compositions were dried for one hour at room temperature. After the drying, the OHP sheets were subjected to two tests: "abrasion test with a nail" of a person in charge of the test and "abrasion test with a cloth. The evaluation criteria are as follows:

"Abrasion Test with a Nail"

AA: no change observed on the printed surface
A: slight scratches observed on the printed surface
B: scrapes observed on the printed surface, but no peeling-off
C: peeling-off of the printed surface "Abrasion Test with a Cloth"

AA: no change observed on the printed surface
A: one or two scrapes observed on the printed surface, but no recognizable difference in the quality as a printed matter
B: three or more scrapes observed on the printed surface, but no peeling-off
C: peeling-off of the printed surface It is confirmed from the results of Examples 1 to 4 that when a polyurethane resin having a glass transition temperature of 50° C. or less is used, the white ink composition shows excellent abrasion resistance in both the abrasion test with a nail and the abrasion test with a cloth.

It is confirmed from the results of Comparative Examples 1 and 3 that no excellent abrasion resistance effect is obtained when a resin other than the polyurethane resin is used.

It is also confirmed from the results of Comparative Example 2 that no excellent abrasion resistance effect is obtained when a polyurethane emulsion having a glass transition temperature of 65° C. is used.

The invention is not limited to the above-described embodiment, and various modifications are possible. For example, the invention includes substantially the same structures (for example, a structure having the same function, process, and result or a structure having the same purpose and effect) as those described in the embodiment. Furthermore, the invention includes structures in which components not being essential of the structures described in the embodiment are substituted. Furthermore, the invention includes structures that can achieve the same effects or the same purposes as those of the structures described in the embodiment. Furthermore, the invention includes structures in which publicly known technology is added to the structures described in the embodiment.

What is claimed is:

1. A white ink composition comprising: hollow resin particles; and a polyurethane resin, wherein the polyurethane resin has a glass transition temperature between about 20 degrees C. and about 50 degrees C.

2. The white ink composition according to claim 1, wherein the polyurethane resin is dispersed as particles in a solvent.

3. The white ink composition according to claim 1, wherein the amount of the polyurethane resin is 0.5 to 10% by weight.

4. The white ink composition according to claim 1, wherein the hollow resin particles have an average particle diameter 0.2 to 1.0 μm.

TABLE 1

| Component | Solid content (%) | Tg (° C.) | Example 1 | Example 2 | Example 3 | Example 4 | Comparative Example 1 | Comparative Example 2 | Comparative Example 3 |
|---|---|---|---|---|---|---|---|---|---|
| Hollow resin particles SX8782 (D) | 28 | — | 10.0 | 10.0 | 10.0 | 10.0 | 10.0 | 10.0 | 10.0 |
| Takelack W-6061 | 30 | 25 | 5.0 | — | — | — | — | — | — |
| Takelack W-6021 | 30 | −60 | — | 5.0 | — | — | — | — | — |
| WBR-2019 | 32.5 | 45 | — | — | 5.0 | — | — | — | — |
| WBR-022U | 31 | 20 | — | — | — | 5.0 | — | — | — |
| SE-909E | 40.5 | 20 | — | — | — | — | 3.7 | — | — |
| Takelack WS-500 | 30 | 65 | — | — | — | — | — | 5.0 | — |
| 3MF-574 | 45.5 | 70 | — | — | — | — | — | — | 3.3 |
| Glycerin | — | — | 10.0 | 10.0 | 10.0 | 10.0 | 10.0 | 10.0 | 10.0 |
| 1,2-Hexanediol | — | — | 3.0 | 3.0 | 3.0 | 3.0 | 3.0 | 3.0 | 3.0 |
| Triethanolamine | — | — | 0.5 | 0.5 | 0.5 | 0.5 | 0.5 | 0.5 | 0.5 |
| BYK-348 | — | — | 0.5 | 0.5 | 0.5 | 0.5 | 0.5 | 0.5 | 0.5 |
| Ion-exchanged water | — | — | residue | residue | residue | residue | residue | residue | residue |
| Total | | | 100.0 | 100.0 | 100.0 | 100.0 | 100.0 | 100.0 | 100.0 |
| Abrasion resistance (abrasion test with a nail) | | | A | A | A | AA | B | C | C |
| Abrasion resistance (abrasion test with a cloth) | | | AA | AA | A | AA | A | B | C |

5. The white ink composition according to claim 1, wherein the amount of the hollow resin particles is 5 to 20% by weight.

6. The white ink composition according to claim 1, further comprising: at least one organic solvent selected from alkanediols and glycol ethers.

7. The white ink composition according to claim 1, further comprising: an acetylene glycol surfactant or a polysiloxane surfactant.

8. The white ink composition according to claim 1, wherein the white ink composition is applied to an ink-jet recording system.

9. A recorded material having an image formed by using the white ink composition according to claim 1.

10. The white ink composition according to claim 2, wherein the solvent comprises water.

* * * * *